United States Patent [19]

Bagley et al.

[11] Patent Number: 5,761,397
[45] Date of Patent: Jun. 2, 1998

[54] CONTROLLING LOGICAL CHANNEL USE BASED UPON PRINTING SYSTEM ENVIRONMENT

[75] Inventors: Elizabeth L. Bagley, Meridian, Id.; Vincent J. Kenkel, Hayward, Calif.

[73] Assignee: Hewlett-Packard Company, Palo Alto, Calif.

[21] Appl. No.: 571,501

[22] Filed: Dec. 13, 1995

[51] Int. Cl.⁶ ................................... G06K 15/00
[52] U.S. Cl. ........................... 395/114; 395/112
[58] Field of Search ................... 395/114, 112, 395/115, 116, 101, 500, 527, 200.02, 113, 110, 117, 828, 831, 834, 835, 200.79, 822, 882; 358/407, 468, 404, 444, 296; 347/142; 400/76, 70, 61

[56] References Cited

U.S. PATENT DOCUMENTS

| | | | |
|---|---|---|---|
| 5,461,701 | 10/1995 | Voth | 395/101 |
| 5,490,237 | 2/1996 | Zimmerman et al. | 395/115 |
| 5,555,374 | 9/1996 | Armerding et al. | 395/200.02 |
| 5,596,416 | 1/1997 | Barry et al. | 358/296 |
| 5,633,992 | 5/1997 | Gyllenskog | 395/114 |

*Primary Examiner*—Edward L. Coles, Sr.
*Assistant Examiner*—Dov Popovici
*Attorney, Agent, or Firm*—Lane R. Simmons

[57] ABSTRACT

A system and method controls logical channel use when ECP negotiation is made between a host computer and a dual mode printer. Namely, specifically defined logical channel functionality is provided for the dual mode printer supporting, for example, Sleek ECP and PCL ECP communications. The method comprises (a) the host computer negotiating with the printer into a first communication mode other than ECP mode, in the event that the computing system is to subsequently enter into Sleek ECP mode; (b) setting a placeholder in a memory of the printer, the placeholder indicating that subsequent negotiation into ECP mode requires logical channel use; (c) terminating the first communication mode; (d) negotiating into ECP mode; (e) reading the placeholder to determine if it is set; and, (f) activating logical channels for use in the event the placeholder is set.

21 Claims, 2 Drawing Sheets

CONTROLLING LOGICAL CHANNEL USE BASED UPON PRINTING SYSTEM ENVIRONMENT

FIELD OF THE INVENTION

This invention relates in general to image transfer technology and, more specifically, to negotiation of logical channel use for high data transfer rates between a host and a page printer which processes image data received in control language format or in a bit map format.

BACKGROUND OF THE INVENTION

Many laser printers are configured to receive data from a host computer in a control language format. A widely used control language is called "printer control language" (PCL). When operating in a PCL environment, a host computer configures a data stream to include both print function commands and interspersed print data. The printer converts the received data stream into a list of simple commands, called display commands, which define what must be printed. The printer then processes the display commands and renders the described objects into a raster bit map. In general, only a small proportion of the printer's available memory is allocated to storage of the print function commands and interspersed data, with the majority of the print buffer area being given over to support of processing functions and the resultant raster bit map image.

Other printer systems employ a procedure wherein the host computer rasterizes image data and sends it to the printer in the rasterized form. Such data is transmitted to the printer at high data rates and is termed in the art as the "Sleek" printing mode. The Sleek facility enables the use of a host computer's more powerful processor to accomplish the rasterization of an image and then transfer the rasterized image to the printer. The Sleek printing environment does not use PCL and never sends PCL information to the printer.

In typical page printers, all control of the print engine is handled through a combination of firmware and hardware. In a printer configured to interface with a host computer operating with Sleek, all print engine control (page motion, engine status requests, engine status reads, etc.) is directed by software from the host computer through "logical channels" to specific hardware and memory in the printer. A logical channel is established when the host computer sends a specific code value to the printer which, in turn, recognizes that value as defining a particular logical channel over which information is to be transmitted, either from the host computer to the printer, or vice- versa. These logical channels are a necessary part of controlling the printed page in Sleek mode. One such logical channel enables the host computer to detect the values in a printer status register which identify printer state conditions.

In order to accommodate such remote print engine control and the high data transfer rates required for real time printing, some systems employ a communication protocol that enables both high speed data transfers to the printer and reverse direction monitoring of printer status signals. One such communication protocol is the IEEE P1284 Extended Capabilities Port (ECP) protocol entitled "Standard Signaling Method for a Bi-directional Parallel Peripheral Interface for Personal Computers". This high data transfer rate is useful for all printers to boost their data throughput, whether the printer employs conventional control language, such as PCL, or bit map format, such as Sleek. In either case, the host computer and printer must negotiate into the ECP mode. While the ECP mode will hereinafter be discussed with respect to the present invention, those of ordinary skill in the art will realize that any protocol which enables high speed bilateral communications between a printer and a host computer is equally usable in place thereof.

ECP supports logical channel selection by a host computer. Accordingly, such a protocol enables the host to control a printer employing a Sleek environment. Therefore, to achieve increased data transfer rates in the Sleek printing environment, the host may negotiate into ECP mode and use the logical channels described in the IEEE P1284 specification.

Although the printing of a PCL page using ECP mode is capable of logical channel functionality, PCL generally does not select a logical channel. For example, PCL only uses a default data channel, and the data channel does not require a "logical channel" selection to occur.

Although a majority of laser printers on the market support only a single method of defining and printing a print job (such as PCL, PostScript, Sleek, etc.), recent developments have allowed printers to support more than one method. For example, a printer may provide, selectively, both PCL and Sleek printing capabilities in a "dual" mode capable environment. However, because both the PCL and Sleek printing environments can use ECP mode, there resides a conflict of how the printer should respond to logical channel selection within ECP mode. For the traditional printer using PCL with ECP, the printer may want to react differently to logical channel selection, than it would for logical channel selection under the Sleek printing environment using ECP. For example, the printer may not provide any data on a logical channel read if in PCL mode, whereas it may want to provide data if the logical channel read occurred with the Sleek printing environment.

One solution to this dilemma (in context of a dual mode capable printer) is to never allow logical channel selection under ECP mode. However, this would limit printing to a PCL-only solution and would eliminate the possibility of using ECP mode in a Sleek printing environment.

Accordingly, objects of the present invention are to provide a means and method for determining whether or not logical channel functionality should be activated when ECP negotiation is made in a dual mode printing environment.

SUMMARY OF THE INVENTION

According to principles of the present invention in a preferred embodiment, a system and method controls logical channel use when ECP communication is established between a host computer and a dual mode printer. Namely, the present invention provides specifically defined logical channel functionality for ECP use in a printer having, selectively, both Sleek and control language printing environments. A preferred method comprises: (a) the host computer and printer negotiating into a first communication mode other than ECP mode, in the event that the computing system is to subsequently enter into Sleek ECP mode; (b) setting a placeholder in a memory of the printer, the placeholder indicating that subsequent negotiation into ECP mode requires logical channel use; (c) terminating the first communication mode; (d) negotiating into ECP mode; (e) reading the placeholder to determine if it is set; and, (f) activating logical channels for use in the event the placeholder is set.

Other objects, advantages, and capabilities of the present invention will become more apparent as the description proceeds.

DETAILED DESCRIPTION OF THE INVENTION

Figure 1:
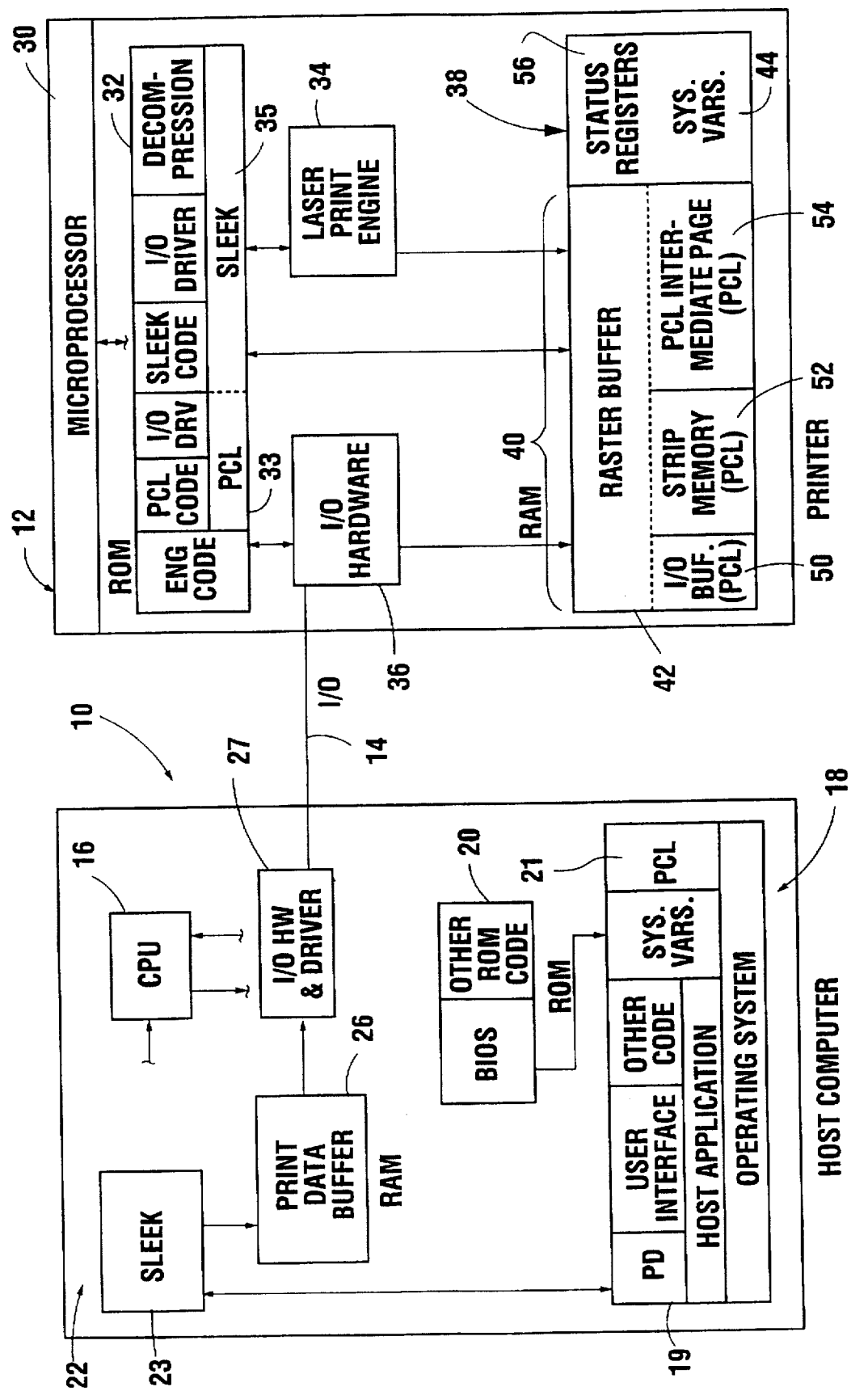
FIG. 1 is a block diagram showing internal aspects of a host computer and an attached dual printing mode environment laser printer, wherein the host and printer incorporate the present invention system and method of controlling logical channel use for a predefined communication mode such as ECP.

FIG. 1 is a block diagram showing host computer 10 connected to printer 12 via an input/output (I/O) interface 14 which enables high speed data transfers. For the purposes of this description, host computer 10 is assumed to be a personal computer and printer 12 a laser printer. It will be further assumed that I/O interface 14 enables an IEEE P1284 Extended Capabilities Port (ECP) data transfer. This hardware/firmware configuration embodies the present invention and provides a means for implementing the method of the present invention for controlling logical channel use. The method of the present invention will be described more fully (in reference to FIG. 2) after FIG. 1 is described as a means for implementing the method.

Host computer 10 includes central processing unit 16 and a random access memory (RAM) that is segmented into a number of portions. RAM portion 18 contains software code for implementing a conventional operating system; a print driver 19; a control language driver 21, such as PCL; user interface data; and a host application. A further RAM portion 22 includes printer-driver software for enabling host computer 10 to operate in Sleek mode 23 in combination with printer driver 19. A further portion of RAM 26 is set aside to act as a print data buffer for containing raster image data that has been formatted by Sleek driver 23 and is ready to be transferred to laser printer 12 via I/O hardware and driver module 27.

Read-only memory (ROM) 20 includes firmware for controlling the basic input/output system (BIOS), and code for controlling other host functions. PCL driver 21, under control of the operating system, may send PCL print commands and data directly to printer 12 without any logical channel selection or use (other than the default "data" channel), or may configure and feed PCL print commands and data to Sleek module 23. Sleek module 23 may implement the PCL commands and data into a Sleek format to be transmitted as Sleek data over interface 14 via I/O hardware and driver 27. On the other hand, Sleek module 23 may prepare and send Sleek data directly to printer 12 without receiving or converting any PCL data from PCL driver 21.

In reference to printer 12, microprocessor 30 controls the overall functions of the printer and its modules. ROM 32 contains both PCL mode firmware 33 and Sleek mode firmware 35 for controlling laser print engine 34. PCL mode firmware 33 enables received PCL-configured code to be converted to a page intermediate form and then formed into a raster configuration for printing by laser print engine 34. The I/O driver portion of PCL mode firmware 33 controls I/O hardware module 36 to properly respond to received PCL commands and data.

Sleek mode firmware 35 is a bit map control code and includes a Sleek code section that allocates a portion of RAM 38 as an I/O buffer 40, and an I/O driver control section. I/O buffer 40 serves either as a raster image buffer 42 or as a control language/data buffer 50, 52, and 54. When buffer 40 is configured as a raster image buffer 42, it receives raster-formatted data from I/O hardware 36 and stores it temporarily, prior to feeding it to print engine 34. Otherwise buffer 40 is configured to include portions 50, 52, and 54 for use when receiving PCL data from host computer 10. Portion 50 serves as an I/O buffer; portion 52 as a storage for page strips created during PCL processing; and portion 54 contains intermediate code created during PCL mode processing actions. It is to be understood that when in the Sleek mode, the entirety of RAM 40 is allocated for use as raster image buffer 42. By contrast, when printer 12 is in the PCL state, substantially all of buffer 40 is allocated for use as portions 50, 52, and 54.

Within systems variables portion 44 of RAM 38 is a group of status registers 56 which include entries that indicate the status of various functions and states in printer 12. For instance, status registers 56 indicate whether a paper out condition exists; a paper jam condition; a printer door open condition; or whether a PCL job is active. The states manifested by status registers 56 are determinable by host computer 10 when interface 14 operates in the ECP mode. In such mode, a number of logical channels are establishable, some of which enable reverse data flow from printer 12 to host computer 10, and enable interrogation of printer status information.

The hardware and firmware defined with respect to FIG. 1 depicts a preferred embodiment for implementing the present invention of controlling logical channel use for a predefined communication mode such as ECP. Furthermore, as mentioned, while the ECP mode is discussed herein with respect to the present invention, those of ordinary skill in the art will realize that any protocol which enables high speed bilateral communications between a printer and a host computer is equally usable in place thereof.

This combination of hardware and firmware provides a system and method for determining whether or not logical channel functionality should be activated when ECP negotiation is made. Namely, a means for negotiating is provided, between the host computer and the printer, into a first communication mode other than the ECP mode in the event that the host computer is to subsequently enter into the Sleek ECP mode. Specifically, host 10 transmits a protocol identifier which is recognized by microprocessor 30 of printer 12 as establishing the first communication mode. This first communication mode is established, preferably, using an extensibility request value (byte) compatible with the IEEE P1284 specification guidelines. This provides for a common negotiation process. Namely, using the extensibility byte allows for the negotiation process into the first communication mode to be the same as for a subsequent negotiation into ECP, except for the actual extensibility byte used. In this fashion, the logical channels and definitions for each negotiation can be the same, thereby obviating any need for "knowing" which negotiation process is actually occurring. Furthermore, using the extensibility byte provides for a logical channel to be selected upon negotiation into the first communication mode, whereby printer status communications can occur such as determining whether the printer is in PCL or Sleek mode. On the other hand, the first communication mode may be negotiated using any generally predefined command recognized by both the host and printer.

The system further provides a means for setting a placeholder in a memory of the printer, the placeholder indicating that a subsequent negotiation into ECP mode requires logical channel use. The placeholder may be stored, for example, in status registers 56, or it may be some other command.

In the event the first communication mode is established with the extensibility byte, the first communication mode is subsequently terminated after setting the placeholder. Then, I/O driver 27 provides a means for negotiating via I/O 14 with printer 12 into ECP mode. As indicated, this ECP negotiation will mimic the first communication mode negotiation using the extensibility byte. CPU 16 reads the placeholder in RAM 38 and, if it is set, activates logical channel communication for use. This setup allows printer 12 to know if logical channel functionality should be activated when ECP negotiation is made. For example, host 10 may, selectively, enable Sleek and ECP with logical channel use or PCL and ECP without logical channel use (or with restricted use).

Figure 2:
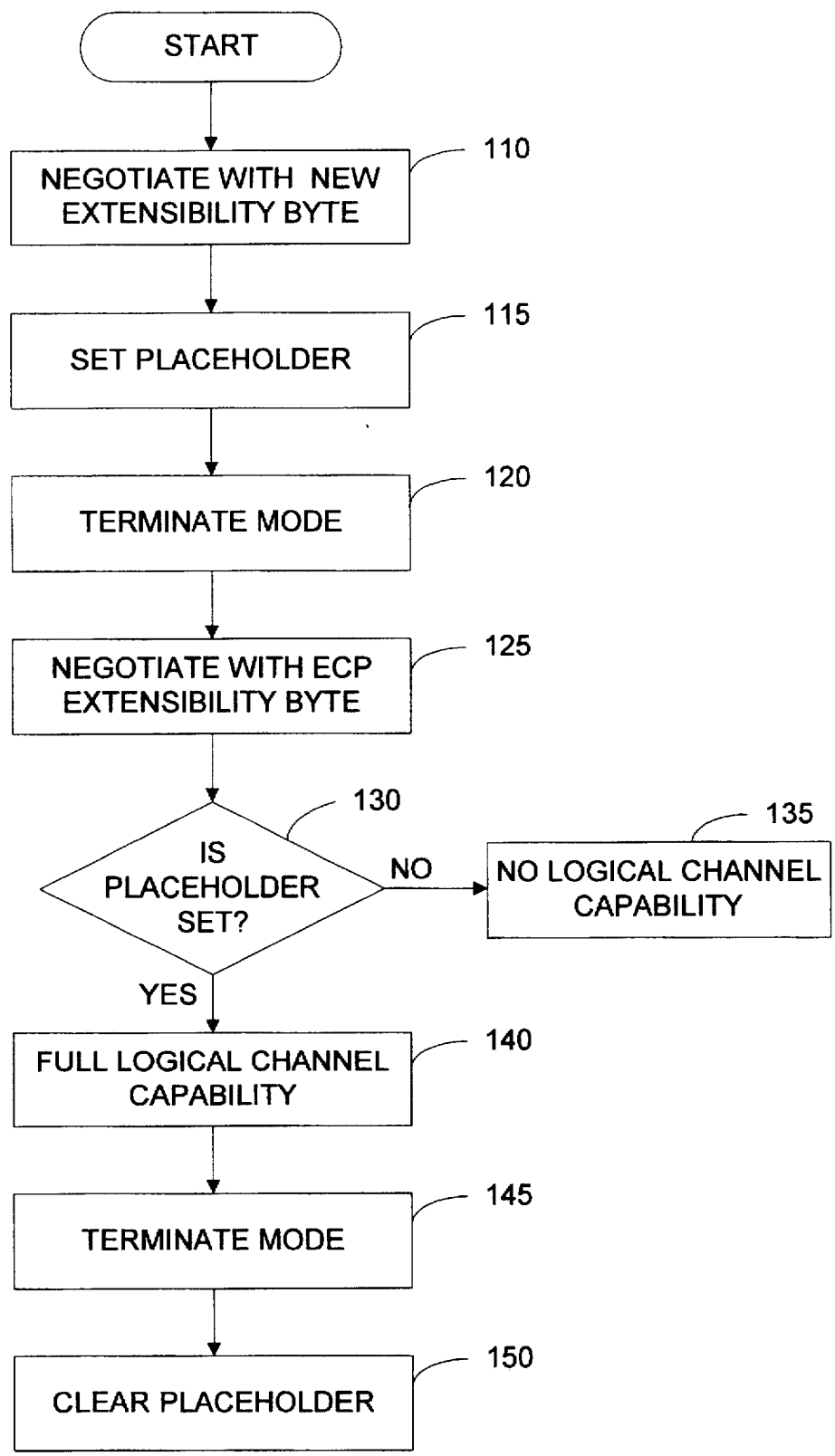
FIG. 2 is a flow chart showing a preferred method of implementing the present invention for determining whether or not logical channel functionality should be activated when ECP negotiation is made.

Referring now to FIG. 2, the flow chart shows a preferred method of the present invention for controlling logical channel use upon establishing a predefined communication mode (such as ECP) in a dual mode printer. Because both the PCL and Sleek printing environments can use ECP mode, there resides a conflict of how the printer should respond to logical channel selection within ECP mode. For PCL mode with ECP, the printer may want to react differently to logical channel selection than it would for logical channel selection under Sleek using ECP. For example, the printer may not provide any data on a logical channel read if in PCL mode, whereas it may want to provide data if the logical channel read occurred in the Sleek printing environment.

Accordingly, printer 12 must initially determine whether or not to use logical channels when an ECP negotiation is made. If ECP is established for Sleek mode communications, then logical channels must be used. On the other hand, if ECP is established for PCL mode communications, then no logical channel selection is required. But since printer 12 doesn't necessarily know the mode that the host wants to operate with (be it Sleek or PCL) when ECP negotiation is made, it must determine whether or not to use logical channels. As such, the present invention provides a means and method by which the printer may know to use and select logical channels upon an ECP negotiation. Throughout discussion of the present invention method, both FIG. 2 and FIG. 1 will be referenced.

With this background in mind, it will be assumed that printer 12 is initially operating under control of PCL mode firmware 33. It is further assumed that host 10 desires to negotiate with the printer into Sleek ECP. The initial PCL state may, for example, occur at power-on when printer 12 enters its default state, or when printer 12 processes a PCL print job responsive to a host request. In either case, host 10 will desire to negotiate into Sleek ECP when it has a Sleek print job to transmit to printer 12.

The first step, 110, is for the host to negotiate into a first communication mode other than the predefined communication mode (ECP in this example). In a preferred embodiment, this is accomplished using an extensibility request value (byte) within the guidelines of the IEEE P1284 specification. As previously discussed, this provides for: (1) a common negotiation process to be established between this first negotiation and a subsequent negotiation into ECP; (2) the logical channels and definitions for each negotiation to be the same; and (3) a logical channel to be selected upon negotiation into the first communication mode, whereby printer status communications can begin to occur with the host.

On the other hand, the first communication mode may be negotiated into using any generally predefined command recognized by both the host and printer. However, regardless of the actual method used, this negotiation is the enabler for allowing Sleek ECP, and the negotiation must happen before the printer will know that Sleek ECP logical channels can be subsequently used.

After successful negotiation into this first communication mode, a placeholder is set 115. This placeholder serves to indicate that the next negotiation into ECP mode needs full logical channel capabilities. As previously mentioned, the placeholder may be stored, for example, as a value in the printer memory, or as a status of the configuration of the printer memory (i.e., a state indicator). Then, after the placeholder is set, the host terminates this first communication mode 120 (in the event the extensibility byte is used) to allow for subsequent negotiation into ECP.

Next, 125, the host and printer negotiate into ECP. As conventional in the art, this is accomplished by host 10 transmitting a protocol identifier which is recognized by processor 30 as establishing the ECP data transmission protocol. In response to receiving the protocol identifier, printer 12 (after some initial negotiations with host 10) enters the ECP mode.

Subsequently, since printer 12 does not know the mode that the host wants to operate with (be it PCL or Sleek mode), it must determine whether logical channel selection should be enabled. Accordingly, printer 12 checks (reads) its own status to determine whether the placeholder is set 130. If it is not set, then no logical channel selection is to occur 135 (i.e., Sleek mode is not being established), and the logical channels can be restricted as needed for PCL printing.

In contrast, if the placeholder is set, full logical channel selection and use is to be established 140 (the printer is entering Sleek mode), and data transfers are to be conducted using ECP forward transfer mode. This logical channel selection and use is accomplished by performing several steps. Namely, host computer 10 transmits a code value which establishes a logical channel to enable the values in status registers 56 to be interrogated. Microprocessor 30 saves all PCL variables and re-allocates portions 50, 52 and 54 of buffer 40 (previously used for PCL actions) for use as raster buffer 42 for Sleek operations. Upon completing such reallocation, microprocessor 30 resets a status bit in status registers 56 to indicate the availability of printer 12 to receive Sleek raster data. At this stage, full Sleek ECP communication is provided with complete logical channel functionality.

Finally, after the desired Sleek ECP communications are completed, Sleek ECP mode may be terminated 145 and the placeholder cleared 150. This is to allow for the possibility that a next negotiation into ECP may be with PCL mode.

This invention has the novel advantage of allowing a Sleek printing system use of ECP forward transfers and logical channels for page control while restricting logical channel usage within PCL printing for the same host/printer system. A further advantage is that no additional requirements are placed on the PCL printing system for allowing the Sleek printing system full logical channel capabilities.

In summary, what has been described above are the preferred embodiments for a system and method of controlling whether or not logical channel functionality should be activated when ECP negotiation is made in a dual mode printer system. It will be obvious that the present invention is easily implemented utilizing any of a variety of hardware and software existing in the art. Furthermore, while the present invention has been described by reference to specific embodiments, it will be obvious that other alternative embodiments and methods of implementation or modification may be employed without departing from the true spirit and scope of the invention.

What is claimed is:

1. A method of controlling logical channel use for a predefined communication mode in a computing system having a host computer communicating with a printer in a current given communication mode, the method comprising:

(a) the host computer negotiating with the printer into a first communication mode other than the predefined communication mode and other than the current given communication mode in the event that the computing system is to subsequently enter into the predefined communication mode;

(b) setting a placeholder in a memory of the computing system, the placeholder indicating that subsequent negotiation into the predefined communication mode requires logical channel use;

(c) the host computer negotiating with the printer into the predefined communication mode;

(d) determining if the placeholder is set; and, (e) activating logical channels for use in the event the placeholder is set.

2. The method of claim 1 wherein the predefined communication mode is a high data transfer rate protocol for specifying how data transfers occur over a port between the host computer and the printer.

3. The method of claim 2 wherein the predefined communication mode is an Extended Capabilities Port (ECP) protocol.

4. The method of claim 3 whereby in the event the placeholder is set, the computing system supports a Sleek printing environment in connection with ECP, and whereby in the event the placeholder is not set, the computing system supports a control language printing environment in connection with ECP.

5. The method of claim 1 wherein the first communication mode satisfies extensibility request values compatible with the predefined communication mode for providing similar negotiation processes.

6. The method of claim 1 wherein the predefined communication mode and the first communication mode comply with IEEE P1284 specifications, and further including establishing logical channel use in the first communication mode for communications between the host computer and the printer beneficial to negotiating into the predefined communication mode, and further including terminating the first communication mode prior to negotiating into the predefined communication mode.

7. The method of claim 1 wherein the first communication mode is established by the printer recognizing a predetermined command received from the host computer.

8. The method of claim 1 wherein the placeholder is set by storing a value in a memory of the printer.

9. The method of claim 1 wherein the placeholder is set by reconfiguring a memory of the printer such that the memory is capable of receiving a bit map image from the host computer.

10. The method of claim 1 further including clearing the placeholder for subsequent negotiations after terminating the predefined communication mode.

11. A method for controlling logical channel use for Extended Capabilities Port (ECP) communication mode in a computing system having a host computer in communication with a printer, the printer being capable of supporting a control language format printing environment and a Sleek printing environment, the method comprising:

(a) the host computer negotiating with the printer into a first communication mode other than ECP mode in the event that the host computer is to subsequently enter into Sleek ECP mode;

(b) storing a state indicator in a memory of the printer in response to the first communication mode, the state indicator indicating that subsequent negotiation into ECP mode requires logical channel use;

(c) terminating the first communication mode;

(d) the host computer negotiating with the printer into ECP mode;

(e) determining a status of the state indicator in the memory of the printer; and, (f) activating logical channels for use in the event the status of the state indicator indicates logical channel use is required, whereby the Sleek printing environment may exist with ECP, and whereby in the event the status does not indicate logical channel use is required, the control language printing environment may exist with ECP.

12. A system for controlling logical channel use for a predefined communication mode between a host computer and a printer, the system comprising:

(a) means for negotiating, between the host computer and the printer, into a first communication mode other than the predefined communication mode and other than a current given communication mode in the event that the host computer is to subsequently enter into the predefined communication mode;

(b) means for setting a placeholder in a memory of the printer, the placeholder indicating that subsequent negotiation into the predefined communication mode requires logical channel use;

(c) means for terminating the first communication mode;

(d) means for negotiating, between the host computer and the printer, into the predefined communication mode;

(e) means for determining if the placeholder is set; and, (f) means for activating logical channels for use in the event the placeholder is set.

13. The system of claim 12 wherein the predefined communication mode is a high data transfer rate protocol for specifying how data transfers occur over a port between the host computer and the printer.

14. The system of claim 13 wherein the predefined communication mode is an Extended Capabilities Port (ECP) protocol.

15. The system of claim 14 whereby in the event the placeholder is set, the system supports a Sleek printing environment in connection with ECP, and whereby in the event the placeholder is not set, the system supports a control language printing environment in connection with ECP.

16. The system of claim 12 wherein the first communication mode satisfies extensibility request values compatible with the predefined communication mode for providing similar negotiation processes.

17. The system of claim 12 wherein the predefined communication mode and the first communication mode comply with IEEE P1284 specifications for establishing logical channel use in the first communication mode for communications between the host computer and the printer beneficial to negotiating into the predefined mode.

18. The system of claim 12 wherein the means for setting the placeholder includes means for storing a value in the memory of the printer.

19. The system of claim 12 wherein the means for setting the placeholder includes means for reconfiguring the memory of the printer such that the memory is capable of receiving a bit map image from the host computer.

20. The system of claim 12 further including means for clearing the placeholder.

21. A computer-readable medium having computer-executable instructions for performing steps in the method recited in claim 1.

* * * * *